(12) United States Patent
Park

(10) Patent No.: US 6,672,003 B2
(45) Date of Patent: Jan. 6, 2004

(54) WALL-HANGING PLANT POT

(76) Inventor: Hong Ku Park, 203 Southcrest Dr., Huntsville, AL (US) 35802

( * ) Notice: Subject to any disclaimer, the term of this patent is extended or adjusted under 35 U.S.C. 154(b) by 12 days.

(21) Appl. No.: 10/165,137

(22) Filed: Jun. 10, 2002

(65) Prior Publication Data

US 2002/0152677 A1 Oct. 24, 2002

Related U.S. Application Data

(63) Continuation-in-part of application No. 10/127,642, filed on Apr. 22, 2002, now abandoned.

(51) Int. Cl.[7] .............................. A01G 9/02; A47G 7/02
(52) U.S. Cl. ................................. 47/67; 47/65.5; 47/79; 248/27.8; 248/311.3; 248/312.1; 248/313; 215/217; 215/214
(58) Field of Search ............................ 47/65.5, 65.6, 47/66.2, 66.7, 67, 79, 80, 41.11; 248/27.8, 311.3, 312.1, 313, 318, 403, 317; 215/217, 214; A01G 9/02

(56) References Cited

U.S. PATENT DOCUMENTS

| | | | |
|---|---|---|---|
| 124,207 A | * | 3/1872 | Hess |
| 577,800 A | * | 2/1897 | Waterer |
| 1,334,199 A | * | 3/1920 | Weiseman |
| 2,220,024 A | * | 5/1940 | Sipio et al. |
| 2,316,103 A | * | 4/1943 | Reed |
| 3,987,584 A | * | 10/1976 | Yellin ........................ 47/65.6 |
| 4,139,112 A | * | 2/1979 | Cooke ........................ 215/217 |
| 4,198,784 A | * | 4/1980 | Sukert ........................... 47/79 |
| 4,385,742 A | * | 5/1983 | Rocquin ..................... 248/318 |
| 4,499,688 A | | 2/1985 | Droll |
| 4,571,883 A | * | 2/1986 | Shaw ............................ 47/66 |
| 4,803,806 A | * | 2/1989 | Ito ................................ 47/39 |
| 4,837,972 A | | 6/1989 | Reed |
| 4,877,210 A | * | 10/1989 | Missalla ..................... 248/318 |
| 4,912,875 A | | 4/1990 | Tardif |
| D307,877 S | | 5/1990 | White |
| 5,042,197 A | * | 8/1991 | Pope ............................ 47/71 |
| 5,103,586 A | * | 4/1992 | Farrell ..................... 47/41.12 |
| 5,457,911 A | * | 10/1995 | Vollink .......................... 47/67 |
| 5,487,517 A | * | 1/1996 | Smith ......................... 248/215 |
| D409,854 S | | 5/1999 | Rehmert et al. |
| 6,116,434 A | * | 9/2000 | Park ........................ 211/71.01 |
| 6,216,856 B1 | * | 4/2001 | Park ........................... 206/214 |
| 6,299,116 B1 | * | 10/2001 | Levesque ................. 248/312.1 |
| 6,405,881 B1 | * | 6/2002 | Park ........................ 211/71.01 |

FOREIGN PATENT DOCUMENTS

| | | | | |
|---|---|---|---|---|
| DE | 3905678 A1 | * | 2/1989 | ............. A01G/9/02 |
| JP | 410338221 A | * | 12/1998 | ............. B65D/1/09 |

* cited by examiner

Primary Examiner—Peter M. Poon
Assistant Examiner—Andrea Valenti
(74) Attorney, Agent, or Firm—Charles R Ducker

(57) ABSTRACT

A wall-hanging plant pot with a water level control device which keeps suitable moisture and air supplies in the pot. The wall-hanging plant pot comprising a screw or nail, a wall hanger, a container with bottle-neck bottom having one or more projections and bottle-neck bottom, a water level control device, and a cap.

15 Claims, 8 Drawing Sheets

WALL-HANGING PLANT POT

This application is a continuation-in-part of Ser. No. 10/127,642, filed Apr. 22, 2002 now abandoned.

BACKGROUND OF THE INVENTION

The present invention relates generally to a plant pot, and more particularly to a wall-hanging pot which keeps the suitable water and air supplies so as to encourage the healthy growth of plants. The prior art abounds with plant pots or planters using different types of methods to hang pots on a wall and/or to control water level in pots or planters. Numerous such prior art pots are disclosed in United States patents as exemplified by U.S. Pat. Nos. Des. 307,877 to White; Des. 409,854 to Rehmert et al.; 4,837,972 to Reed; 4,499,688 to Droll; 4,912,875 to Tardif; 5,042,197 to Pope; and 5,487,517 to Smith.

While these prior art plant pots might be hung on a wall, overhead beam, or handrail and/or control water level in the pot, all suffer from numerous deficiencies and disadvantages. Some of them can be hung on a wall but are not easily removable from the wall. Some of them involve complicated parts or systems to control water level. The present invention overcomes these deficiencies and disadvantages in that it provides a new and improved wall-hanging plant pot with a water level control device that keeps the suitable moisture and air supplies in the pot for longer period.

SUMMERY OF THE INVENTION

The wall-hanging plant pot of the present invention generally comprises a wall hanger, a container with one or more projections for holding a plant and soil, a water level control device, and a cap for controlling the flow of excess water.

It is an object of the present invention to provide an improved wall-hanging plant pot which can be easily hung on a wall, detached from the wall, and placed in a different place without using special tools.

It is another object of the present invention to provide an improved wall-hanging plant pot which controls the water level and keeps the suitable moisture and air supplies in the pot.

It is a further object of the present invention to provide an improved wall-hanging plant pot which allows excess water to gradually be drained for longer periods through a bottom opening by slightly loosening the cap or which can be taken indoor without drippings of water by tightening the cap.

It is yet a further object of the present invention to provide an improved wall-hanging plant pot which is simple and inexpensive in construction, which may be easily used at home or in other environments, for growing and displaying plants.

Other objects, features, and advantages of the present invention will become apparent from the following detailed description and from the appended drawings in which like numbers have been used to designate like parts throughout the several views.

DETAILED DESCRIPTION OF THE PREFERRED EMBODIMENT

Figure 1:
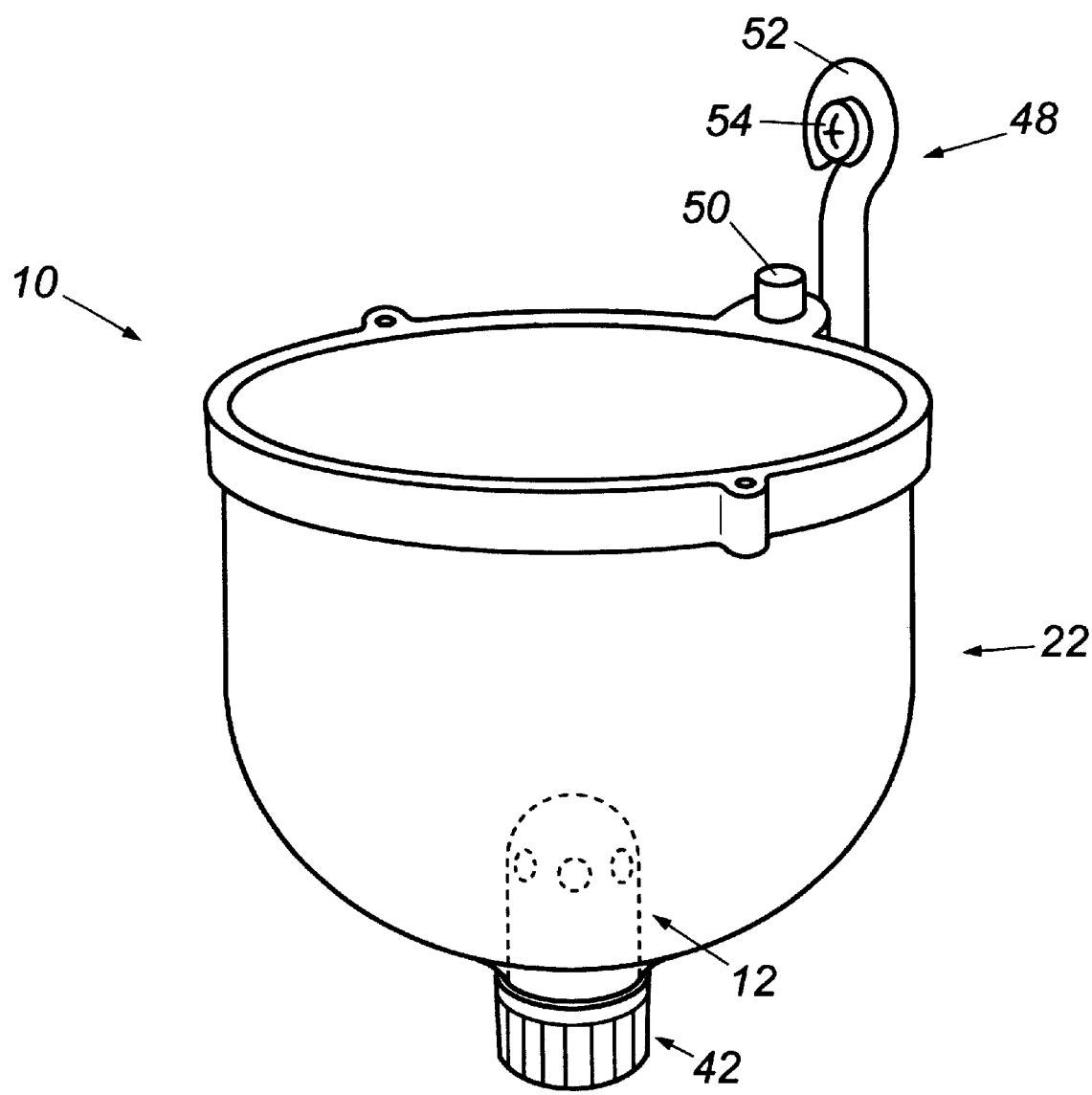
FIG. 1 is a perspective view of the wall-hanging plant pot of the present invention.
Figure 2:
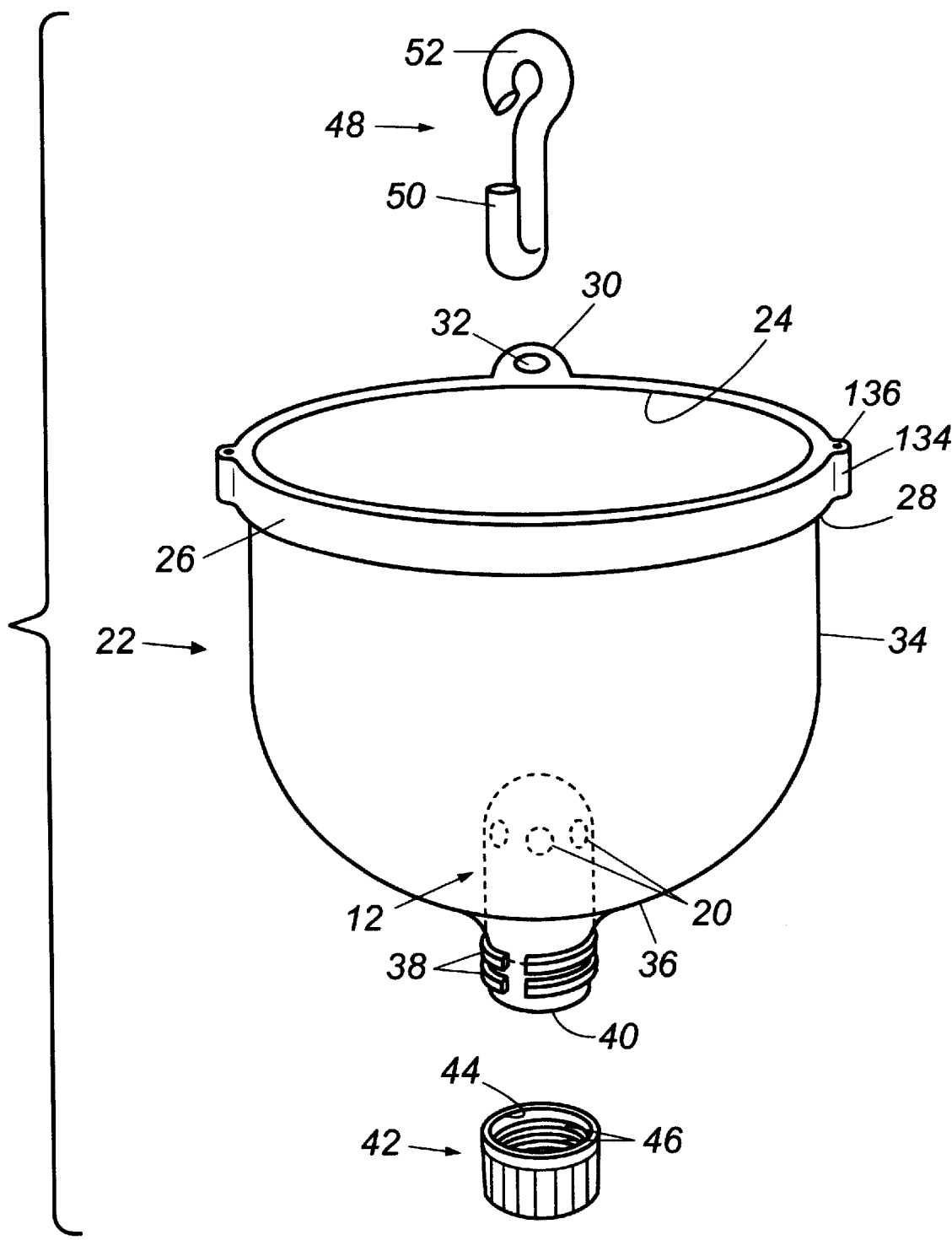
FIG. 2 is a front elevational, exploded view of the wall-hanging plant pot of the present invention.
Figure 5:
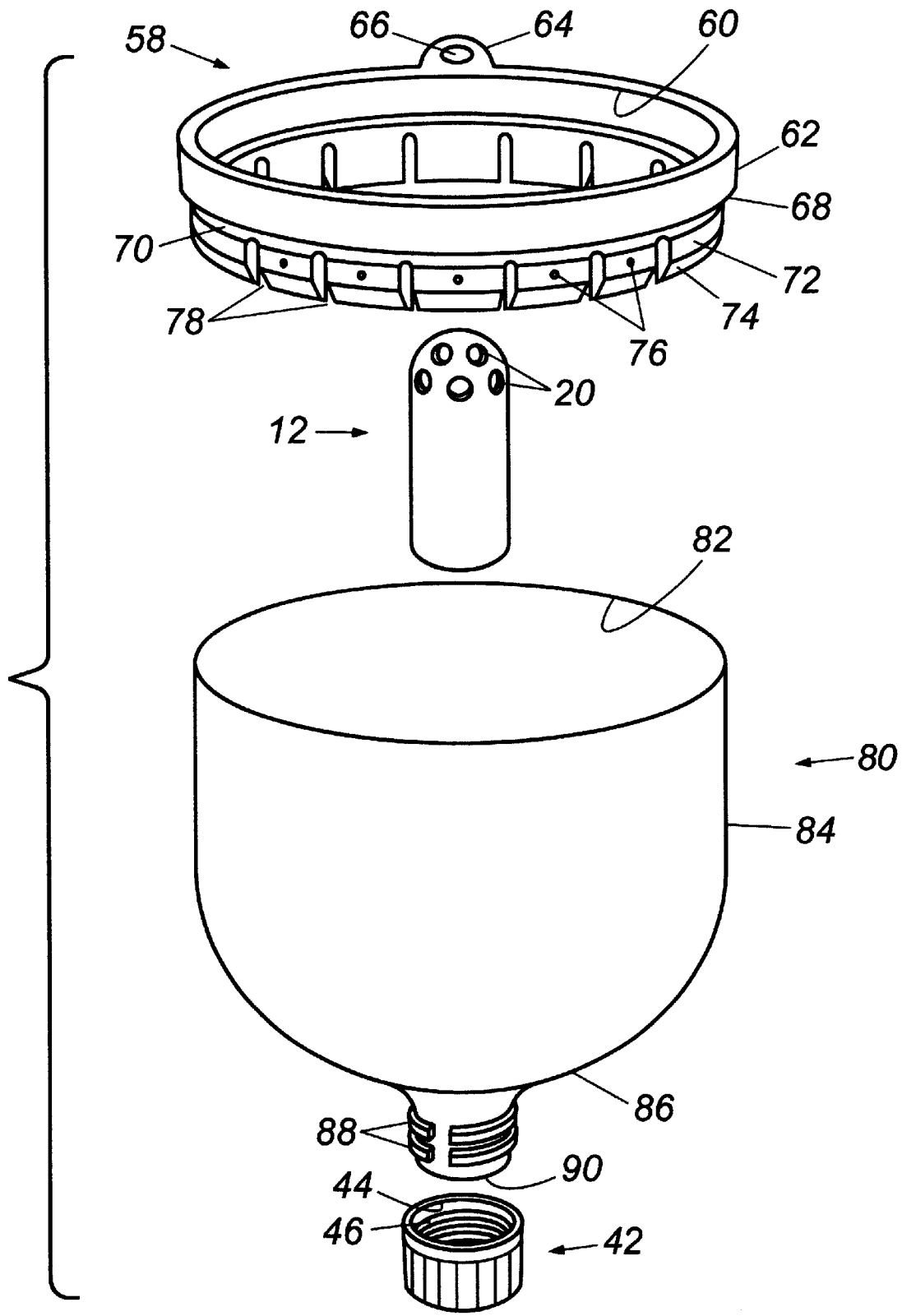
FIG. 5 is a front elevational, exploded view of the second embodiment of the wall-hanging plant pot of the present invention.
Figure 8:
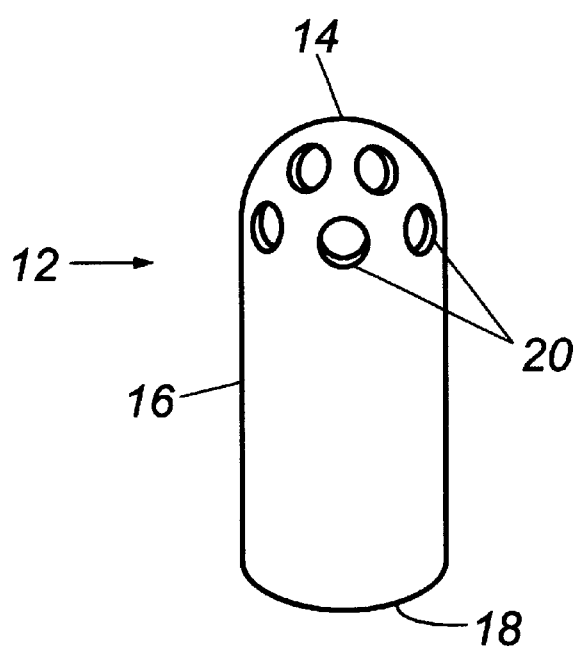
FIG. 8 is a perspective view of the water control device of the present invention.
Figure 9:
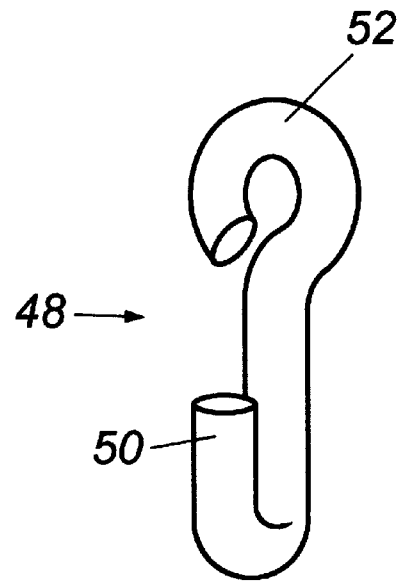
FIG. 9 is a perspective view of the wall hanger of the first and second embodiment of the present invention.
Figure 10:
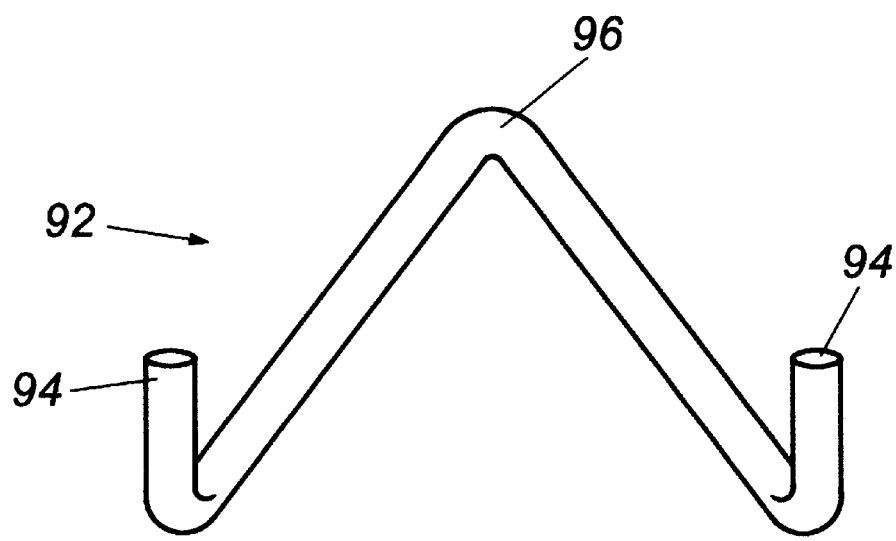
FIG. 10 is a perspective view of the wall hanger of the third embodiment of the wall-hanging plant pot of the present invention.

Referring now to the drawings, wherein like numerals represent like parts throughout, reference numeral 10 generally designates the wall-hanging plant pot of the present invention. As best seen in FIGS. 1 and 2, the wall-hanging plant pot 10 generally comprises a screw or nail 54, a wall hanger 48, a container 22 with one or more projections 30, and a cap 42. As best seen in FIGS. 2 and 9, the wall hanger 48 includes a prong 50 and a screw-resting portion 52. As best seen in FIG. 2, the container 22 includes an upper opening 24, an upper annular portion 26 having one or more projections 30 with an opening 32 therein, an outwardly extending shoulder 28, a wall 34, and a lower portion 36 having an opening 40 surrounded by external threads 38 with a single vertical slot in said external threads 38. As best seen in FIG. 8, a water level control device 12 includes an upper portion 14 having a plurality of openings 20, a side wall 16, and a lower opening 18. As best seen in FIGS. 2 and 5, a cap 42 includes a central opening 44 and internal threads 46.

Figure 3:
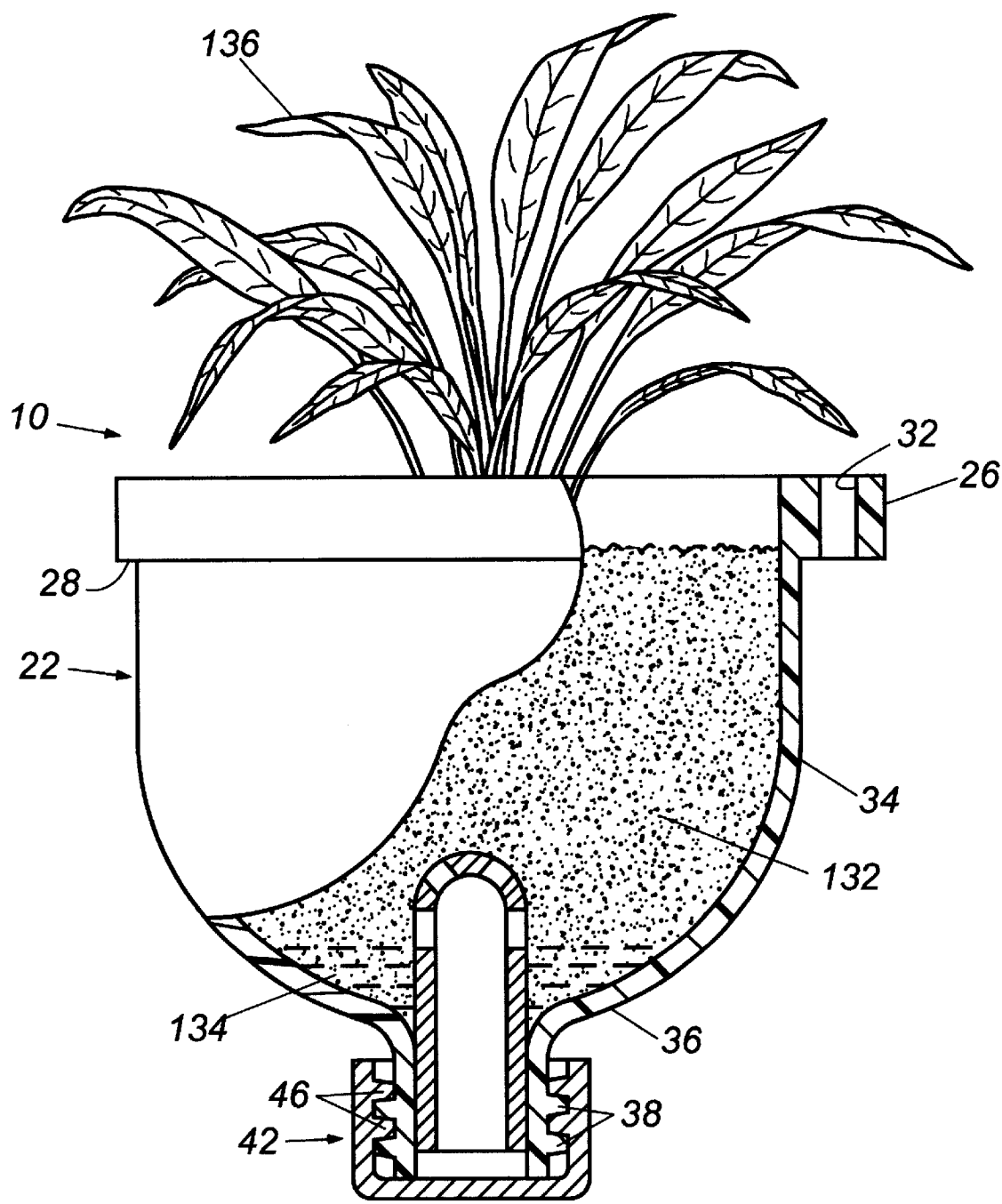
FIG. 3 is a front elevational, partially broken away and in section, view of the present invention having a plant and soil.

The several components of the wall-hanging plant pot 10 is best assembled from its exploded, separated, condition as shown in FIG. 2 to its assembled, joined, condition as shown in FIGS. 1 and 3 in the following order:

a. The water level control device 12 is inserted within the lower opening 40 of the container 22 through the upper opening 24.

b. The cap 42 is threadedly engaged with the threads 38 on the lower portion 36 of the container 22.

c. The small plant 136 and soil 132 are placed in the container 22.

d. The wall hanger 48 is attached to the container 22 by placing the prong 50 into the opening 32 in the projection 30 of the container 22.

e. The fully assembled container 22 and the wall hanger 48 are then hung on a wall by placing the screw-resting portion 52 of the wall hanger 48 onto a screw or nail 54 attached to the wall.

After the wall-hanging plant pot 10 is assembled and the plant and soil are placed in the pot as generally explained, water or premixed solution is added to the container 22. The excess water is drained through the openings 20 in the upper portion 14 of the water level control device 12, and suitable amount of water 134 below the openings 20 remains at the bottom of the container 22 and is gradually absorbed by the soil 132. The excess water drained through the openings 20 is released through the lower opening 40 of the container 22 by slightly loosening the cap 42. The water level control device 12 and the container 12 can be held together by press-fit, and the height of the water level control device 12 can be adjusted by changing the depth of the insertion. The flow of excess water from the opening 40 can be controlled by adjusting the tightness of the cap 42.

Figure 4:
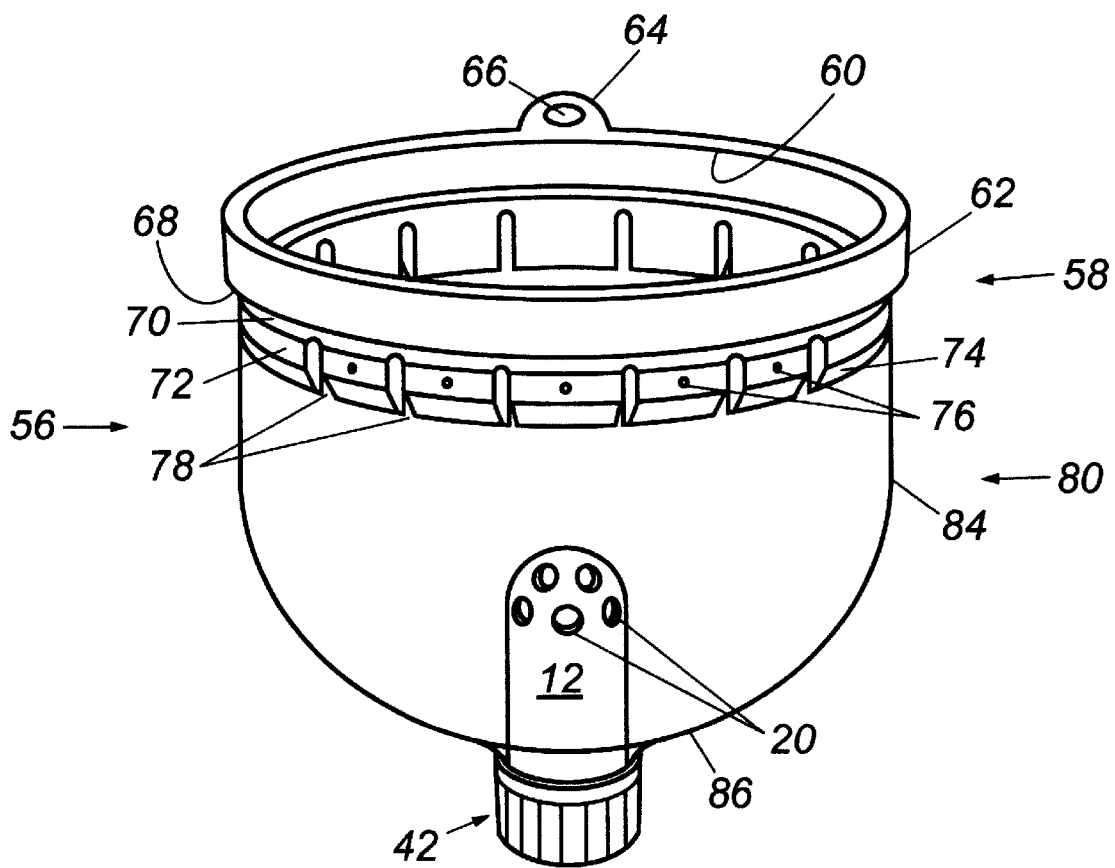
FIG. 4 is a perspective view of the second embodiment of the wall-hanging plant pot of the present invention.

A second embodiment of the wall-hanging plant pot is depicted in FIGS. 4 and 5 with like reference numerals referring to like parts. The embodiment depicted in FIGS. 4 and 5 differs from that disclosed in FIGS. 1–3 in the type of the container for holding a plant and soil. The container for the second embodiment includes two parts, an insert ring and a reservoir.

Referring now to FIGS. 4 and 5, the second embodiment of the wall-hanging plant pot comprises a screw or nail 54, a wall hanger 48, an insert ring 58, a water level control device 12, a reservoir 86, a cap 42. As best seen in FIG. 5, the insert ring 58 includes a central opening 60, an upper annular portion 62 having one or more projection 64 with an opening 66 therein, an outwardly extending shoulder 68, annular groove 70, a lower annular portion 72, a lower tapered portion 74, a plurality of grippers 76, and a plurality of slits 78. As still best seen in FIG. 5, a reservoir 80 includes an upper opening 82, a wall 84, a lower portion 86 having an opening 90 surrounded by external threads 88 with a single vertical slot in said external threads 38.

The wall-hanging plant pot of the second embodiment is assembled to the condition generally depicted in FIG. 4 in the following order. First, insert ring is inserted into the upper opening 82 of the reservoir 80. Second, the water level control device 12 is inserted into the opening 90 of the reservoir 80, and then the cap 42 is threadedly engaged with the threads 88 on the lower portion 86 of the reservoir 80.

The insert ring 58 and reservoir 80 can be held together by friction fit. The grippers 76 and the slits 78 provide resiliency to the lower section (not numbered) of the insert ring 58 to enable the insert ring 58 to fit within the opening 82 of the reservoir 80 of varying internal dimensions. The grippers 76 penetrate the surface of the inner wall 84 of the reservoir 80 to secure the reservoir 80 to the insert ring 58.

Figure 6:
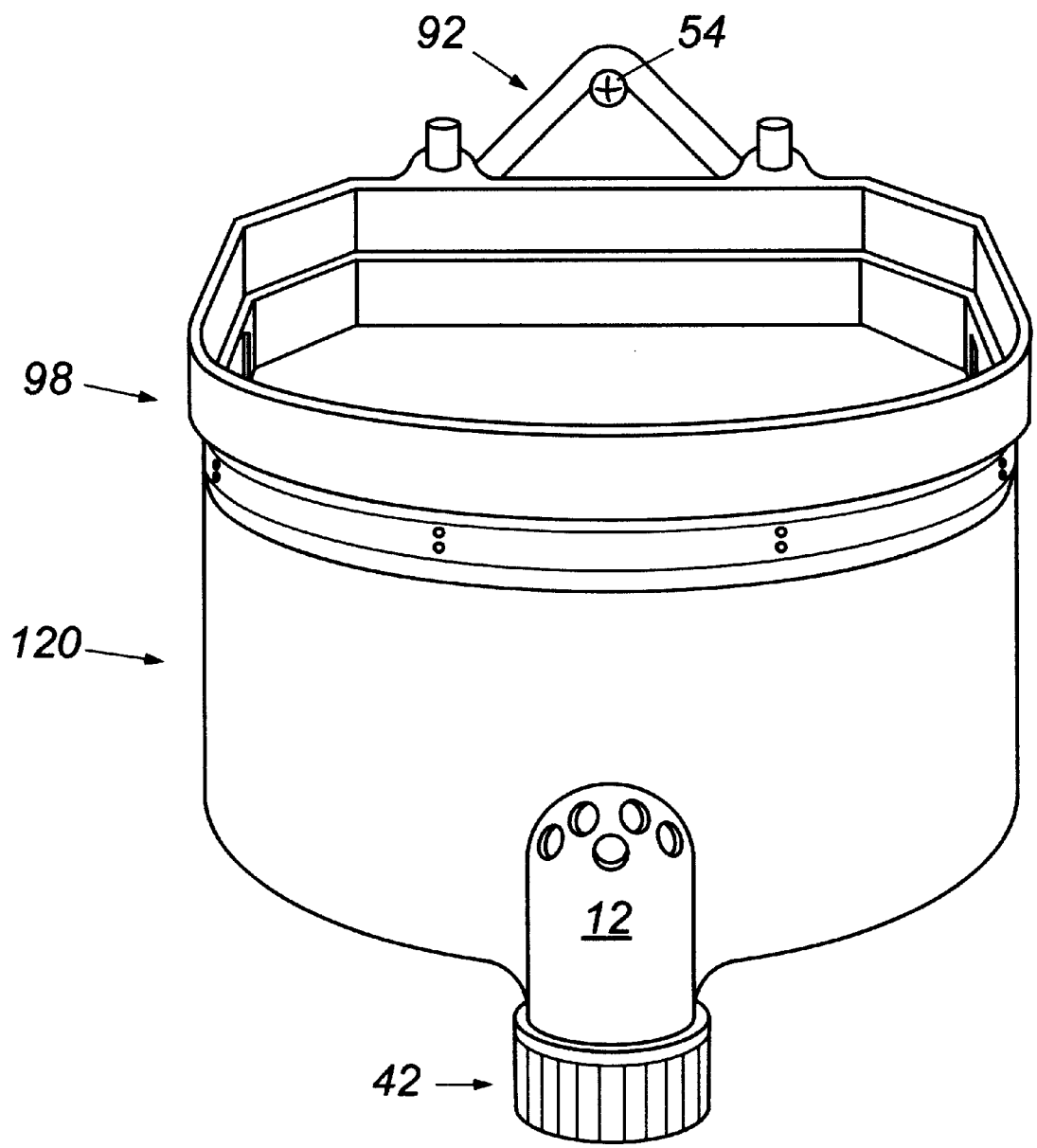
FIG. 6 is a perspective view of the third embodiment of the wall-hanging plant pot of the present invention.
Figure 7:
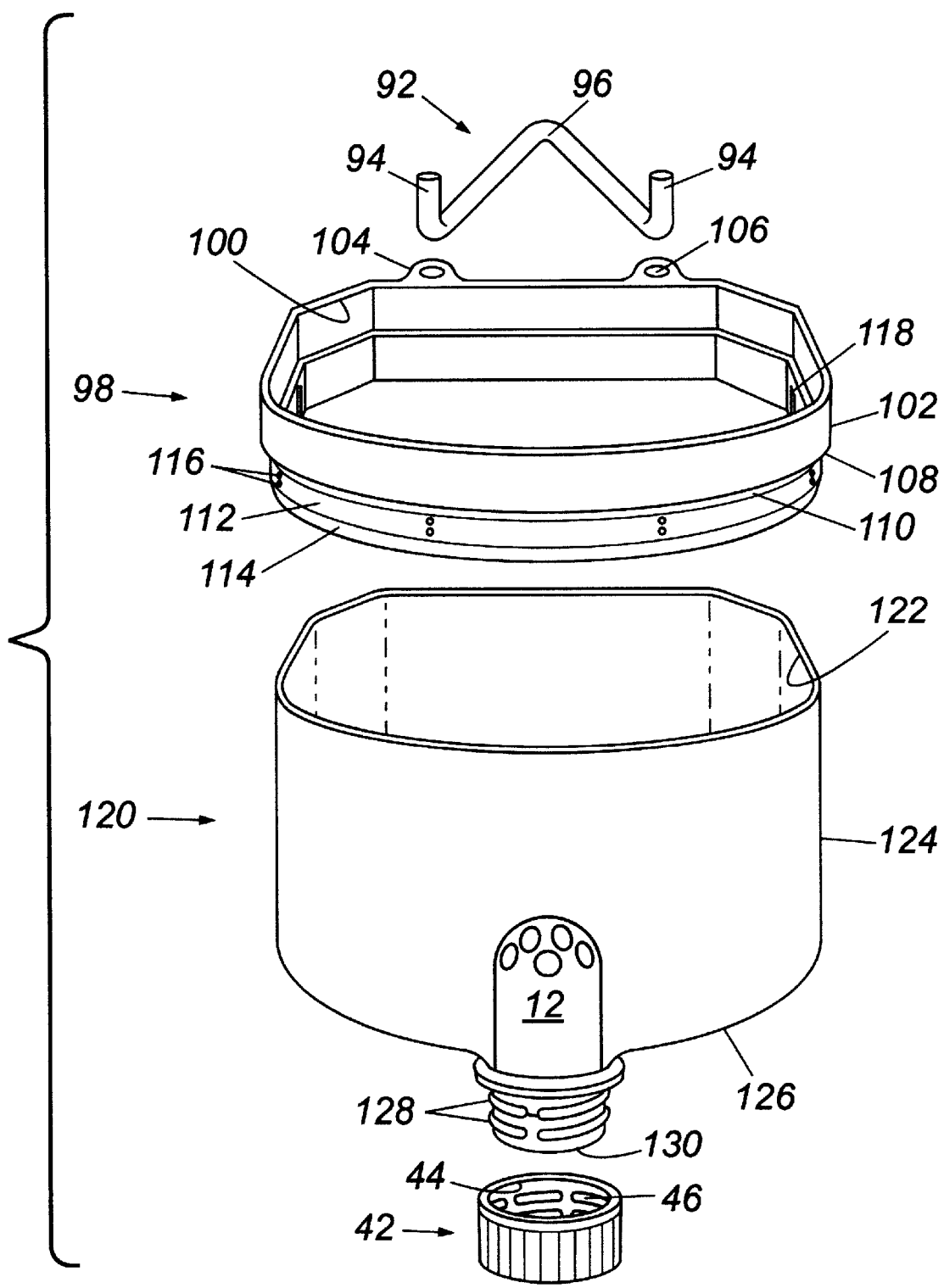
FIG. 7 is a front elevational, exploded view of the second embodiment of the wall-hanging plant pot of the present invention.

Referring now to FIGS. 6 and 7, the third embodiment of the wall-hanging plant pot comprises a screw or nail 54, a wall hanger 92, an adapter 98, a reservoir 120, a water level control device 12, and a cap 42. As best seen in FIG. 7, the wall hanger 92 includes a plurality of prongs 94 and a screw-resting portion 96. As still best seen in FIG. 7, the adapter includes a plurality of projections 104 having an opening 106 therein, a central opening 100, an upper outer portion 102, an outwardly extending shoulder 108, a groove 110, a lower outer portion 112, a tapered portion 114, a plurality of grippers 116, and a plurality of slits 118. As best seen in FIG. 7, the reservoir 120 includes an upper opening 122, a side wall 124, and a lower portion 126 having a lower opening 130 surrounded by threads 128 with a single vertical slot in said external threads 38.

The wall-hanging plant pot of the third embodiment is assembled to the condition generally depicted in FIG. 6 in the following order. First, the adapter 98 is inserted into the upper opening 122 of the reservoir 120. Second, the water level control device is inserted into the lower opening 130 of the reservoir 120, and then the cap 42 is threadedly engaged with threads 128 on the lower portion 126 of the reservoir 120. Finally, the wall hanger 92 is attached to the adapter 98 by placing each prong 94 of the wall hanger 92 in the opening 106 on the projection 106 of the adapter 98.

The adapter 98 and reservoir 120 can be held together by friction fit. The grippers 116 and the slits 118 provide resiliency to the lower section (not numbered) of the adapter 98 to enable the adapter 98 to fit within the upper opening 122 of the reservoir 120 of varying internal dimensions. The grippers 116 penetrate the surface of the inner wall 124 of the reservoir 120 to secure the reservoir 120 to the adapter 98.

While particular embodiments of this invention have been shown in the drawings and described above, it will be appreciated that the invention is susceptible to modifications, variations, and adaptations without departing from the proper scope and fair meaning of the accompanying claims.

What I claim as my invention is:

1. A wall-hanging plant pot comprising:
    a wall-hanging support device including an upper and lower portion, said upper portion for resting on an anchor point and said lower portion for supporting said plant pot;
    a container for holding a plant and soil, said container including an upper opening, an annular portion having a projection with an opening therein and a lower portion having a central opening fitted with external threads;
    an adjustable depth water retention device having an upper end, a side wall, and a lower end having an internal central opening therein, wherein only said upper end of said adjustable depth water retention device has a plurality of external openings therein; and
    a cap for controlling the flow of excess water, said cap including internal threads for rotational communication with said external threads of said central opening of said lower portion of said container.

2. The wall-hanging plant pot of claim 1, wherein said container includes a plurality of projections each with an opening therein.

3. The wall-hanging plant pot of claim 1, wherein said plurality of openings said upper end of said adjustable depth water retention device permit excess water to be drained therethrough to said central opening and past said cap.

4. The wall-hanging plant pot of claim 3, wherein said side wall of said adjustable depth water retention device permits a pre-designated amount of water to remain at said lower portion of said container.

5. The wall-hanging plant pot of claim 1, wherein said cap controls the release and retention of such excess water by being loosened or tightened, respectively.

6. The wall-hanging plant pot of claim 5, wherein said external threads include a single vertical slot therein positioned generally centrally of the front thereof.

7. A wall-hanging plant pot comprising:
    a wall-hanging support device including an upper and lower portion, said upper portion for resting on an anchor point and said lower portion for supporting said plant pot;
    a container including an upper opening, an upper annular portion having a projection with an opening therein, a side wall, and a lower portion having an opening surrounded by external threads;
    an adjustable depth water retention device having an upper end wherein only said upper end of said adjustable depth water retention device has a plurality of external openings therein; and
    a threaded cap for controlling the flow of excess water.

8. The wall-hanging plant pot of claim 7, wherein said upper annular portion has a plurality of projections.

9. The wall-hanging plant pot of claim 7, wherein said cap controls the release and retention of excess water by being loosened or tightened, respectively.

10. The wall-hanging plant pot of claim 9, wherein said external threads include a single vertical slot therein positioned generally centrally of the front thereof.

11. A wall-hanging plant pot comprising:
- a wall-hanging support device including an upper and lower portion, said upper portion for resting on an anchor point and said lower portion comprising a plurality of hooks for supporting said plant pot;
- an adaptor for holding a reservoir, said adaptor including a central opening, a plurality of projections, said projections corresponding to said plurality of hooks, an upper outer portion, a groove, a lower outer portion, a tapered portion, a plurality of grippers, and a plurality of slits;
- a reservoir for holding a plant and soil, said reservoir including an upper opening, a side wall, and a lower portion having a lower externally threaded opening;
- an adjustable depth water retention controller including an upper portion, a side wall, and a lower portion with an internal central opening therein, wherein only said upper portion of said adjustable depth water retention controller has a plurality of external openings therein; and
- a cap including a central opening and internal threads.

12. The wall-hanging plant pot of claim 11, wherein said reservoir has an upside down bottle top configuration.

13. The wall-hanging plant pot of claim 11, wherein said adjustable depth water retention controller may be positioned within said reservoir so as to control the depth of the water retained therein.

14. The wall-hanging plant pot of claim 13, wherein said cap is operable to control the release and retention of excess water by being loosened or tightened, respectively.

15. The wall-hanging plant pot of claim 14, wherein said external threads include a single vertical slot therein positioned generally centrally of the front thereof.

* * * * *